United States Patent
Osterlanger et al.

(10) Patent No.: US 8,800,129 B2
(45) Date of Patent: Aug. 12, 2014

(54) METHOD FOR PRODUCING A SPINDLE NUT FOR A BALL SCREW

(75) Inventors: Jurgen Osterlanger, Emskirchen (DE);
Dieter Adler, Herzogenaurach (DE);
Manfred Kraus, Herzogenaurach (DE);
Ralf Mayer, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1017 days.

(21) Appl. No.: 12/871,098

(22) Filed: Aug. 30, 2010

(65) Prior Publication Data

US 2011/0035930 A1 Feb. 17, 2011

Related U.S. Application Data

(62) Division of application No. 11/569,632, filed as application No. PCT/EP2005/005319 on May 14, 2005, now abandoned.

(30) Foreign Application Priority Data

May 26, 2004 (DE) .......................... 10 2004 025 683

(51) Int. Cl.
*B23P 13/04* (2006.01)
(52) U.S. Cl.
USPC ......................................... 29/558; 74/424.87
(58) Field of Classification Search
USPC ............................................................ 29/558
See application file for complete search history.

(56) References Cited

U.S. PATENT DOCUMENTS

| | | | |
|---|---|---|---|
| 2,618,166 A | 11/1952 | Douglas | |
| 4,484,931 A * | 11/1984 | Kushigian | ..................... 451/222 |
| 4,680,982 A | 7/1987 | Wilke et al. | |
| 6,675,669 B2 | 1/2004 | Sekiya et al. | |
| 7,080,571 B2 | 7/2006 | Watanbe et al. | |
| 2002/0023513 A1 | 2/2002 | Sekiya et al. | |
| 2003/0106385 A1 | 6/2003 | Ninomiya | |
| 2003/0172759 A1 | 9/2003 | Hayashi | |
| 2005/0076733 A1 | 4/2005 | Yamanoto et al. | |

FOREIGN PATENT DOCUMENTS

| | | |
|---|---|---|
| DE | 6917373 | 7/1972 |
| DE | 2355844 | 6/1974 |
| DE | 2914756 | 10/1980 |
| DE | 3635212 | 4/1988 |
| DE | 3930900 | 3/1991 |
| DE | 4412539 | 10/1994 |
| DE | 19509265 | 9/1995 |
| DE | 19749137 | 6/1998 |

(Continued)

*Primary Examiner* — David Bryant
*Assistant Examiner* — Moshe Wilensky
(74) *Attorney, Agent, or Firm* — Volpe and Koenig, P.C.

(57) ABSTRACT

A spindle nut for a ball screw is provided, having a continuous ball track (1) for balls (2), a ball groove (3,14) for the balls (2) extending on an inner periphery of the spindle nut about the rotational axis thereof and along a helical line, the ball groove extending across at least one thread (4), and a diversion device (5), in order to divert with its diverting channel (9) balls (2) from one end of the thread (4) to the beginning of the thread (4). The spindle nut is provided with ball inlets (13, 16), on the one side connected to the ball groove (3, 14) and, on the other side connected to the diverting channel (9), with the ball groove (3, 14) and the ball inlet (13, 16) both having identical cross-sectional profiles.

6 Claims, 3 Drawing Sheets

(56) References Cited

FOREIGN PATENT DOCUMENTS

| | | |
|---|---|---|
| DE | 19803026 | 8/1999 |
| DE | 10022715 | 12/2000 |
| DE | 19944875 | 3/2001 |
| DE | 10200878 | 3/2003 |
| DE | 10243020 | 3/2004 |
| EP | 0985470 | 3/2000 |
| JP | 2004144239 | 5/2004 |

\* cited by examiner

METHOD FOR PRODUCING A SPINDLE NUT FOR A BALL SCREW

CROSS-REFERENCE TO RELATED APPLICATIONS

This application is a divisional application of U.S. application Ser. No. 11/569,632, filed Dec. 1, 2006, which was a 371 National Phase Application of PCT/EP05/05319, filed May 14, 2005, which claims the benefit of German Patent Application DE 102004025683.7, filed May 26, 2004, all of which are incorporated herein by reference as if fully set forth.

BACKGROUND

The present invention relates to a spindle nut for a ball screw. Preferably the present invention relates to such ball screws used as electro-mechanical steering aids for steering devices of motor vehicles.

From DE 199 44 875 A1 a spindle nut for a ball screw is known, for example, which has an endless ball track for balls. At the inner periphery of the spindle nut, around its rotational axis, a ball groove for balls is provided along a helical line, extending over several threads. Further, a diverting device is provided, in the diverting channels of which balls are deflected from one end of a common thread of the ball groove to the beginning of said common thread of the ball groove. Here, the diverting device is formed by a multitude of diverting pieces, which are each inserted into an opening provided at the periphery of the spindle nut. In order for the balls to be inserted from the ball groove of the spindle nut into the diverting channel of the diverting piece impact free and with low noise, a ball inlet is formed at the spindle nut, which on the one side is adjacent to the ball groove of the spindle nut and, on the other side, extends to the opening of the spindle nut. This ball inlet is frequently prepared or post processed manually, which is rather expensive. While the ball groove provided in the spindle nut frequently and preferably has a so-called gothic profile, i.e. the flanks of the ball groove are larger than the diameter of the balls and intersect at the bottom of the ball groove, such a profile cannot be achieved when producing the ball inlet. Frequently a conical inlet profile develops in the ball inlet.

SUMMARY

The object of the present invention is to provide a spindle nut according to the features of the preamble of claim 1, in which the balls can be inserted from the ball groove of the spindle nut into the diverting channel of the diverting device as impact-free as possible and in a low noise manner.

This object is attained according to the invention in that the ball groove provided in the spindle nut and the ball inlet both are provided with the same cross-sectional profile. Thus, according to the invention the ball inlet may also have a gothic cross-sectional profile. This gothic cross-sectional profile contributes to a flawless introduction of the balls into the diverting channel. Preferably the ball inlet begins, as seen in the longitudinal cross-section, at the ball groove, thus connects here, and ends at the diverting channel, with the ball inlet, extending along the way radially outwardly, preferably rising in a steady curve. When the ball groove is laid out in a plane, the ball inlet has a preferably convex form, preferably the so-called gothic profile seen in the cross-section. The same embodiment of the cross-section of the ball inlet and the ball groove also allows an corner-free transfer from the ball groove to the ball inlet and therefrom to the diverting channel of the diverting device. Instead of a gothic profile, profiles may also be suitable that are created such that the balls can be guided therein.

When similar to the above-mentioned prior art individual diverting is provided, it is particularly beneficial when the ball inlet, measured around the rotational axis of the spindle nut, extends over an angle α of up to 60 degrees, preferably up to 20 degrees, with the angle beginning at the opening and ending at the ball groove. An angle of approx. 4 degree is recommended as the lower limit. Within these noted angles, the ball inlet rises steadily so that it is ensured that the ball is stressed to an only gradually increasing extent, when it has left the ball inlet and enters the ball groove of the spindle nut, in which it is stressed. Simultaneously it is ensured that the stress of the balls is released gradually only when the balls are deflected from the loaded section of the ball groove via the ball inlet into the diverting channel of the diverting device. In common construction sizes of spindles, spindle nuts, and balls, the listed range of angles is equivalent to a range from half to two-thirds of the diameter of the ball.

Alternatively to the so-called individual diverting, a ball screws is known in which the spindle nut is provided with two openings arranged at the periphery, between which a ball groove extends over several threads. At the exterior periphery of the spindle nut, an exterior diverter is provided, having the diverting channel. This so-called exterior diverter can be formed by a pipe, for example, with its one end engaging one opening and its other end engaging another opening, while according to the invention the ball inlet, measured around the rotational axis of the spindle nut, extends over an angle ranging up to 360 degrees, with this angle beginning at the opening and ending at the ball groove. However, small angles are beneficial, preferably 180 degrees. By using this wide angle, the advantage of an only gradual stress and release of the balls is emphasized even more. When a stationary lateral force acts upon the rotating spindle nut the advantage of the large inlet angle is particularly beneficial: the unsteadiness in the stiffness-behavior of the ball screw is caused by the incline of the ball groove. During one full rotation, the ball inlet passes once through the level in which the lateral force impacts. The wider the inlet angle, the gentler the inlet of the balls into the diverting channel or out of the diverting channel. For example, when a spindle nut is provided with three carrying, full threads of the ball grooves, and the first and last thread each form a ball inlet over 360 degrees one thread is always carrying, while the exterior threads are increasingly or decreasingly loaded depending on the rotary progression. The life, smooth performance, and a low noise run are positively influenced.

The angle both in individual diverting as well as in the last described exterior diverting can also occur preferably under consideration of the operational load. Under a given operational load, the balls give. The length of the ball inlet may be approximately equivalent to the size of the maximum ball compression. This means, that first the ball, being fully stressed, is elastically deformed and then elastically releases when entering the ball inlet and at the end of the ball inlet, thus when entering the diverting channel of the diverting device, returns to its original ball shape. The length of the ball inlet can therefore also correspond to the deformation behavior of the balls used. Considering these operational loads, spindle nuts can be provided with angles of the ball inlets adjusted to the ball compression in which a very low-nose inlet of the balls from the ball groove into the diverting channel of the diverting device can be ensured.

Further, according to the invention a method for producing a spindle nut for a ball screw is suggested. This method provides that a ball groove for the balls can be inserted at the inner periphery of the spindle nut, around its rotational axis and along a helical line, with a cutting tool. This ball groove extends over at least one thread. Beginning at least at one point of the ball groove and, depending on the relative rotary progression of the tool in reference to the spindle nut, the tool now radially approaches in order to remove more material from the spindle nut. Depending on the relative further rotary progression and ending at another point of the ball groove this approach is reversed and another processing of the ball groove occurs, forming a ball inlet due to the approach of the tool and/or its reversal, and with an opening being provided at the periphery of the spindle nut between said two points, up to which the ball inlet extends. This process can be repeated depending on the selection of the tool, until finally the ball groove and the ball inlet have reached their final shape.

Therefore, in this process according to the invention, both the ball groove as well as the ball inlet can be formed by only one tool. By omitting the step of removing one tool and attaching another tool, in order to perhaps form the ball groove, it is ensured that the transfer from the ball groove to the ball inlet occurs without edges and smoothly. Additionally, no manual processing is necessary. Due to the fact that the tool is preferably provided with a gothic profile it is also ensured that both the ball groove as well as the ball inlet have a gothic cross-sectional profile.

This method can preferably further developed such that first, preferably in a separation process, the opening is provided at the periphery of the spindle nut and adjacent thereto the ball groove with the ball inlet is created. Therefore the tool passes, radially approaching, the area of the opening and then removes more material at the spindle nut. Alternatively, first the ball groove can be formed with at least one ball inlet and adjacent thereto, also preferably in a separation process, the opening is made at the periphery of the spindle nut.

The tool is preferably a rotating cutting tool with its rotational axis preferably being arranged perpendicular to the ball groove, with the rotating sleeve of the tool having the mating profile of the ball groove and the ball inlet in a cross-section through the cutting tool.

Such cutting tools can beneficially be provided for the production of large numbers of spindle nuts.

Other cutting tools may also be used. This tool is not limited in its shape to a profiled cutting disk. For example, a small tool can be moved laterally to the extension of the ball groove in order to create the cross-sectional profile of the ball groove and the ball inlet.

When the method for making spindle nuts with an individual diverting suggested by the invention is used, the following variant according to the invention is suggested: the spindle nut is provided with a multitude of openings distributed over its periphery, in each of which a diverting piece can be inserted having a diverting channel in order to deflect the balls from the beginning to the end of a common thread of the ball groove. Seen in the axial direction of the spindle nut, the openings separate one shoulder of the ball groove each, with openings arranged circumferentially adjacent to one another penetrating a common thread and with the ball inlet being produced by the radial approach of the tool at the one opening and by the reversal of the approach at the other opening arranged adjacent to the one opening. Therefore, by only reversing the approach another ball inlet can be created. This process allows an efficient production process. In the previously described process variation, the tool remains radially positioned between the two ball inlets, which is possible because no balls will ever enter this so-called dead travel range. A variant thereto may be to reverse the radial approach in the dead-path range. The latter variant requires additional tool movements, however, it reduces the duration and the extent of the cutting process. This dead travel area may therefore remain unprocessed.

The ball groove provided along the helical line does not require processing up to the face of the spindle nut, because at least a portion of the last thread of the ball groove forms the dead travel area. This way, the processing expense can be further reduced at the spindle nut.

BRIEF DESCRIPTION OF THE DRAWINGS

In the following the invention is explained using two exemplary embodiments shown in a total of 9 figures. Shown are.

DETAILED DESCRIPTION OF THE PREFERRED EMBODIMENTS

Figure 1:
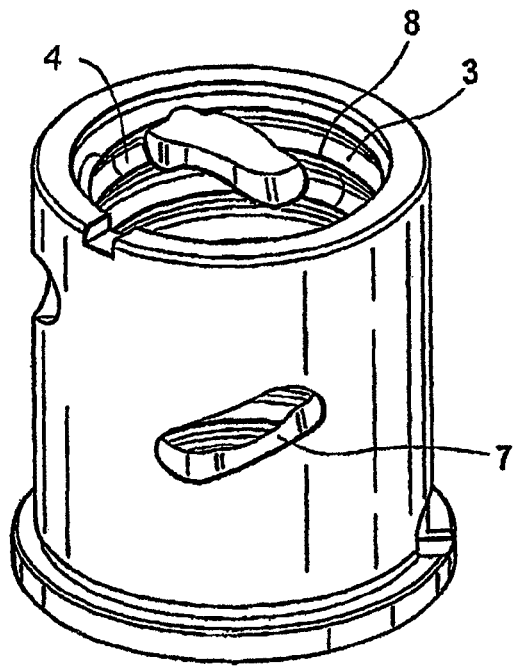
FIG. 1 is a perspective view of a spindle nut according to the invention.

The first exemplary embodiment according to the FIGS. 1 through 5 shows a spindle nut with a so-called individual diverting. This spindle nut is provided with an endless ball track 1 for balls 2 (see FIG. 4). It is discernible from FIG. 1 that a ball groove 3 is formed for balls 2 at the inner periphery of the spindle nut around the rotational axis of the spindle nut and along a helical line. This ball groove 3 extends over several threads 4. Further, a diverting device 5 is provided in order to deflect balls 2 from the beginning to the end of a common thread 4. This diverting device 5 comprises a multitude of diverting pieces 6, each of which is inserted into an opening 7 provided at the periphery of the spindle nut (FIG. 1). The spindle nut has a multitude of openings 7. It is discernible from FIG. 1 that each opening 7 penetrates a shoulder 8 of the ball groove 3. This shoulder 8 lies, when looking at the spindle nut sectioned longitudinally, between two sections of the ball groove 3 arranged axially adjacent to one another.

Figure 4:
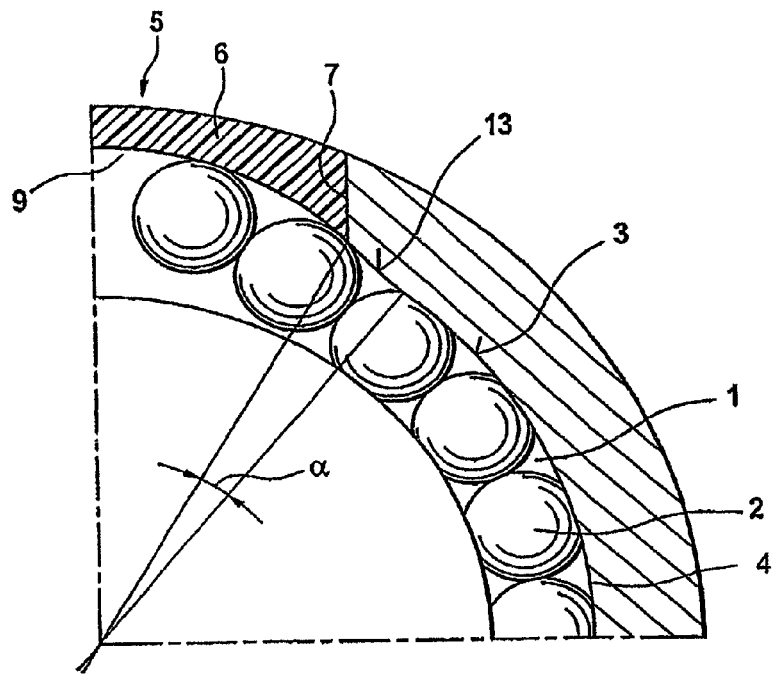
FIG. 4 is a cross-sectional view of a spindle nut according to the invention.

The diverting pieces 6 inserted into said openings 7 have a diverting channel 9, as shown in FIG. 4.

Figure 2:
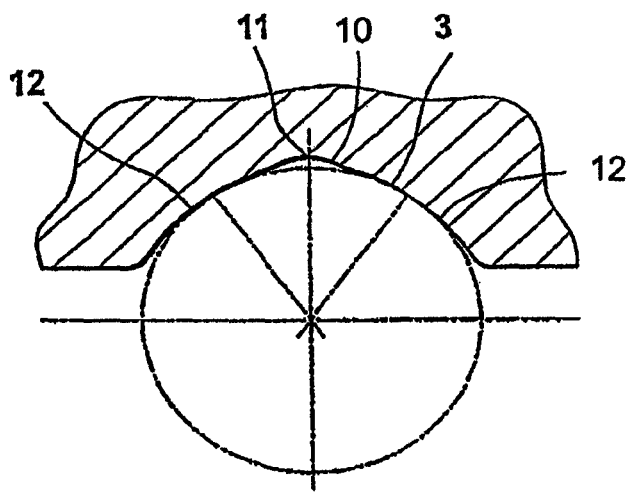
FIG. 2 is a cross-sectional view through a ball groove provided in a spindle nut according to FIG. 1.

The ball groove 3 has a gothic cross-sectional profile 10, as shown schematically in FIG. 2. It is discernible from this figure that the shape of the gothic profile 10 deviates from the circular shape, which is indicated here in dot-dash lines. At the bottom 11 of the ball groove 3 the two flanks 12 of the ball groove 3 intersect. It is discernible from FIG. 2 that a distance exists between the bottom 11 and the marked circle, while in the area of the flanks 12 the circle is tangent to said flanks 11.

Figure 5:
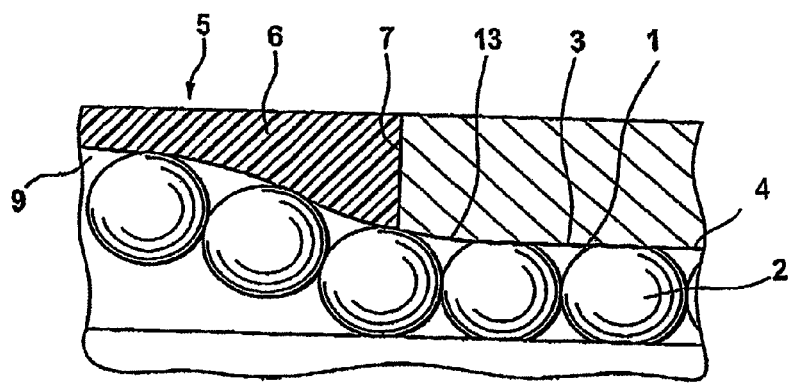
FIG. 5 is a cross-sectional view of a spindle according to the invention sectioned along a ball groove, laid out into a plane.

In the endless circling of the ball 2 in the ball track 1, the balls 2 are deflected from the beginning to the end of a common thread 4 of the ball groove 3. FIG. 4 shows the transfer from the ball groove 3 to the diverting channel 9 in a partial cross-section through the spindle nut. This ball inlet also has a gothic profile, in the cross-sectional view, which is equivalent to the gothic profile 10 of the ball groove 3. The length of the ball inlet 13 along the ball groove 3 is approximately equivalent to an angle α around the axis of the spindle nut, which angle may amount up to 60 degrees. On the one side, this ball inlet 13 connects to the ball groove 3 of the spindle nut in a corner-free manner and, on the other side, connects to the diverting piece 6 of the diverting channel 9. It is further discernible from FIG. 4 that the ball inlet 13, beginning at the ball groove 3 and ending at the diverting channel 9, rises outwardly in a constant curve. This contour is formed convexly, seen in this cross-section. Further, FIG. 4 clearly shows that the ball inlet 13 extends to the opening 7. FIG. 5 clarifies once more the convex embodiment of the ball inlet 13 in the layout of the spindle nut, as sectionally shown in FIG. 5.

In order to produce this spindle nut, beneficially the following method according to the invention is suggested. Here, first the ball groove 3 for the balls is incorporated in a cutting manner at the inner periphery of the spindle nut around its rotational axis and along a helical line with a tool, not shown. Then, subsequent or simultaneous to this process and beginning at a position of the ball groove 3, depending on the relative rotary progression of the tool in reference to the spindle nut, the tool moves radially outward in order to remove more material from the spindle nut. In this way, first the ball inlet 13 is made shown in FIG. 4. Ending at a point following along a helical line, depending on the helical progression of the tool in reference to the spindle nut, this approach is reversed and another incorporation of the ball groove 3 can occur. Opening 7 is located between these two points mentioned the, to which the ball inlet 13 extends.

The opening 7 is preferably produced in a separating process, for example by stamping. Subsequently the ball groove 3 with the ball entry 13 can be produced in the manner described.

Alternative to this process, in the manner described the ball groove 3 can also be produced first with the ball entry 13 and subsequently the opening 7 can also be produced preferably in a separating process.

Considering the position of the openings 7, the other ball inlets can be made in a single process arranged behind one another in the circumferential direction and along a helical line using the tool mentioned. In order to produce a first ball inlet the tool radially approaches in the described manner during the rotary progression of the tool in reference to the spindle nut. In this radially approached position the tool now proceeds along the helical line until it reaches the area of the opening adjacent in the circumferential direction. Now, the tool can be further radially moved during the relative rotary progress of the tool in reference to the spindle nut so that the tool, when leaving the area of the subsequent opening and reaching the level of the ball groove, has made another ball inlet. Between the two described ball inlets, a so-called dead travel is located, which no balls can enter in such ball screws. The mandatory existence of this dead travel provides that the tool no longer needs to be radially distanced between the two ball inlets.

The length of the ball inlets (see FIG. 4), measured along the helical line, is here equivalent to an approximately maximum compression of the balls 2, said compression being a consequence of the stress on the balls 2.

Figure 3:
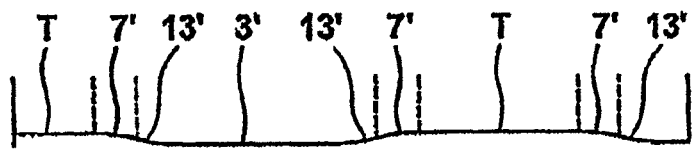
FIG. 3 is a layout of the ball groove shown in FIG. 2.

The described production process of the ball inlets 13 is schematically shown in FIG. 3, with the movement process of the tool, not shown, occurs from the left to the right. The reference characters provided in FIG. 3 each name the radial level of the tool in the individual sections, which are divided as follows: 7' indicates the area inside an opening 7, followed by the area 13' for producing the ball inlet 13. The tool is finally on the level of the ball groove 3, which here is indicated with the reference character 3'. The tool now proceeds over approximately one thread along the ball groove 3. Now, the area 13' follows for producing another ball inlet 13. The tool remains in the approached position and now passes the so-called dead travel area T and continues to proceed into the area of the next opening 7, which is here indicated with 7'. When leaving this opening the radial approach of the tool is reversed so that the next ball inlet 13 is produced, which is here indicated with the reference character 13'. From here, the described cycle is repeated.

Figure 6:
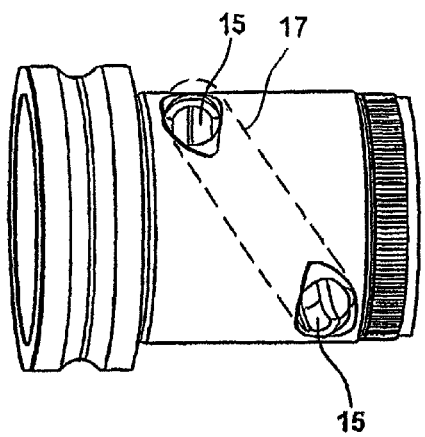
FIG. 6 is a perspective view of another spindle nut according to the invention.
Figure 7:
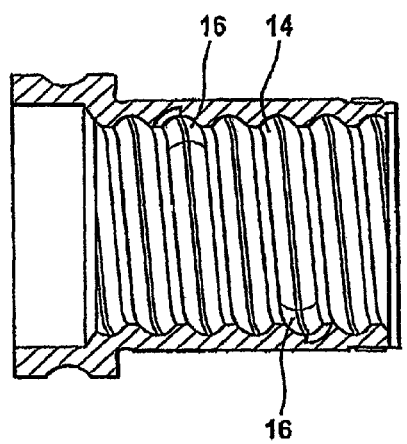
FIG. 7 is a longitudinal cross-section of the spindle nut of FIG. 6.
Figure 8:
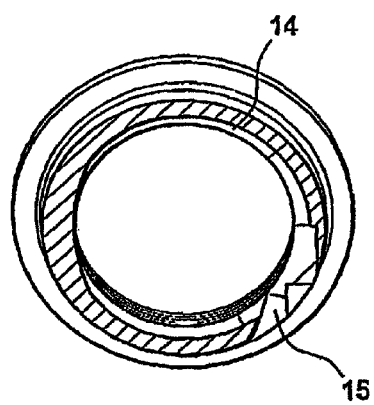
FIG. 8 is a lateral cross-sectional view of the spindle nut of FIG. 6.

A ball screw provided with a so-called exterior diverting is shown in FIGS. 6 through 9. FIG. 6 shows another spindle nut according to the invention in a perspective view, provided with a ball groove 14 at the interior. Further, at the periphery of the spindle nut two openings are provided, for example with a pipe-shaped exterior diverter indicated schematically as 17, with two pipe ends each engaging an opening. As in the previous exemplary embodiments, here too ball inlets 16 are provided, shown in FIG. 7. FIG. 8 shows a cross-section through the spindle nut in the area of the openings 15.

Figure 9:
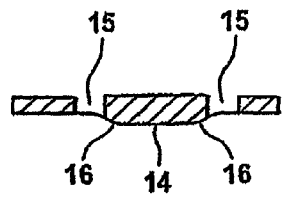
FIG. 9 is a layout of the ball groove of the spindle nut according to FIG. 6 in a schematic view.

FIG. 9 shows, in a sectional view, the spindle nut with the ball groove 14 in a laid out form. The embodiment of the openings 15, the ball inlets 16, and the ball grooves 14 are discernible from this schematic representation. This layout of the ball groove shown is only schematically, though. In particular the area of the ball inlet 16 may extend to a full thread along the helical track.

LIST OF REFERENCE CHARACTERS 1 ball track
2 ball
3 ball groove
4 thread
5 diverting device
6 diverting piece
7 opening
8 shoulder
9 diverting channel
10 gothic profile
11 bottom
12 flank
13 ball inlet
14 ball groove
15 opening
16 ball inlet
17 exterior diverter

The invention claimed is:

1. A method for producing a spindle nut for a ball screw, the spindle nut having a ball groove for balls incorporated at an inner periphery of the spindle nut, the ball groove extending over at least one thread and extending around a rotational axis of the spindle nut along a helical line, the method comprising:
using a single tool to form the ball groove and a ball inlet;
moving the tool radially outwardly in order to remove more material from the spindle nut to form the ball inlet, the moving step beginning at a first point of the ball groove and ending at a second point of the ball groove, the locations of the first and second points each depending on a relative rotary progress of the tool in reference to the spindle nut;

reversing the radially outward movement of the tool, and further processing of the ball groove, wherein the moving step and/or the reversing the radially outward movement step form the ball inlet; and forming an opening that extends to the ball inlet, the opening being located at an outer periphery of the spindle nut between the first and second points.

2. A method according to claim 1, wherein first, in a separating process, the opening is produced at the outer periphery of the spindle nut and subsequently thereto the ball groove with at least one ball inlet is produced.

3. A method according to claim 1, wherein first the ball groove with at least one ball inlet is created and subsequently the opening at the outer periphery of the spindle nut is created.

4. A method according to claim 1, further comprising:

forming a multitude of openings arranged distributed around the periphery, inserting diverting pieces provided with a diverting channel into the openings, the diverting pieces deflecting the balls from a beginning of a common thread of the ball groove to an end of the common thread;

wherein the openings lie in an axial direction of the spindle nut each separating a shoulder of the ball groove and with circumferentially adjacently arranged openings extending into the common thread, and wherein the ball inlet is created at the first opening by the tool approaching the first opening, and the ball inlet is created at the second opening, arranged adjacent to the first opening, by reversing the approach of the tool.

5. A method according to claim 1, wherein the ball groove remains unprocessed at ends of the spindle nut behind a last one of the ball inlets.

6. A method according to claim 1, further comprising forming the ball inlet with a same cross-sectional profile as the ball groove.

\* \* \* \* \*